(12) United States Patent
Booth et al.

(10) Patent No.: US 6,493,719 B1
(45) Date of Patent: Dec. 10, 2002

(54) METHOD AND SYSTEM FOR SCRIPTING FOR SYSTEM MANAGEMENT INFORMATION

(75) Inventors: Roger W. Booth, Redmond, WA (US); Alan G. Boshier, Redmond, WA (US); Corina E. Feuerstein, Redmond, WA (US); Irena Hudis, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/361,638

(22) Filed: Jul. 26, 1999

(51) Int. Cl.[7] .............................................. G06F 17/30
(52) U.S. Cl. ..................... 707/103 X; 707/10; 707/104; 707/103 R; 707/103 Y; 707/103 Z; 704/223; 704/224; 379/219
(58) Field of Search ............................... 707/1–10, 104, 707/103, 513; 717/11; 704/276; 345/335

(56) References Cited

U.S. PATENT DOCUMENTS

| | | | | |
|---|---|---|---|---|
| 5,742,829 A | * | 4/1998 | Davis et al. | 717/11 |
| 5,848,273 A | * | 12/1998 | Fontana et al. | 707/100 |
| 5,870,464 A | * | 2/1999 | Brewster et al. | 379/219 |
| 5,918,015 A | * | 6/1999 | Suzuki et al. | 709/219 |
| 5,933,826 A | * | 8/1999 | Ferguson | 709/9 |
| 5,983,190 A | * | 11/1999 | Trower, II et al. | 704/276 |
| 6,078,743 A | * | 6/2000 | Apte et al. | 717/1 |
| 6,101,509 A | * | 8/2000 | Hanson et al. | 707/513 |
| 6,101,510 A | * | 8/2000 | Stone et al. | 707/513 |
| 6,151,610 A | * | 11/2000 | Senn et al. | 707/516 |
| 6,188,401 B1 | * | 2/2001 | Peyer | 709/328 |
| 6,317,748 B1 | * | 11/2001 | Menziers et al. | 707/103 X |

* cited by examiner

Primary Examiner—Jean M. Corrielus
Assistant Examiner—Anh Ly
(74) Attorney, Agent, or Firm—Law Offices of Albert S. Michalik, PLLC

(57) ABSTRACT

A method and system that simplify the management of enterprise network devices and information through the use of scripts and a scripting object model. An API is provided that transforms scripts passed from a scripting engine into the existing "low-level" COM syntax required for accessing system management object information. A scripting engine interprets a script and works with the API to translate script instructions into the COM method calls needed to directly access properties and methods of CIMOM objects from a script. Other aspects related to scripting are handled, including collections, events, monikers and security. Collections enable a set of objects to be serviced iteratively, for example, to manipulate or retrieve properties for a set of resources in simple loop. Events enable queries to be made asynchronously, such that calls return immediately and complete via event notifications. Monikers enable the simplification of strings in the script, by providing for shorthand definitions to represent a sequence of instructions in a single string. Security is provided, by emulating the ability to set security.

46 Claims, 8 Drawing Sheets

METHOD AND SYSTEM FOR SCRIPTING FOR SYSTEM MANAGEMENT INFORMATION

FIELD OF THE INVENTION

The invention relates generally to computer systems or networks, and more particularly to an improved system and method for accessing computer system information.

BACKGROUND OF THE INVENTION

Network administrators run management applications to perform such tasks as detect machines on a network, inventory software and hardware configurations, and send key information back to a central database. Such management applications receive this information from a variety of disparate sources in an enterprise network.

By way of example, typical sources for management information include databases and the underlying system. For example, a database may be queried by a management application, or a system call may be made to determine the state of some device, e.g., the free space of a disk. Alternatively, some management applications interface directly with instrumentation that can pull information from device drivers or other software components. For example, a management application may communicate with remote disk drive software to determine how much free space remains on a network drive. As can be readily appreciated, the wide variety of management applications and resources, protocols, formats, frameworks, and so on made it difficult and complicated for management applications and the users thereof to obtain the desired information.

A significant improvement for accessing and returning management information is described in U.S. patent application Ser. No. 09/020,146, wherein a common information model object manager (CIMOM) is provided to isolate management applications from the various sources of management information, while providing a single, uniform way to access the information. With the CIMOM, each management application submits queries to the CIMOM in a uniform way. The CIMOM then communicates with one or more sources of the information, known as providers, to return an appropriate reply. The CIMOM is intelligent in that it can decompose queries into requests from multiple providers and synthesize the results into a single response, filter excess information, work with the capabilities of the providers, and so forth.

While the CIMOM thus provides significant benefits in accessing management applications, the CIMOM is designed for client processes written as C++ objects or VB applications with relatively complex syntax. For example, the CIMOM provides COM (Component Object Model) interfaces in a vtable, which is a set of pointers to its methods (functions). These interfaces may require multiple (IN and OUT) parameters that can be very confusing, and use a somewhat unnatural notation to specify properties and methods. As a result, accessing system information via the CIMOM is beyond the capabilities of many users of the system that may benefit from the information, even though those users may be proficient in a scripting language.

SUMMARY OF THE INVENTION

Briefly, the present invention provides a method, system and related concepts that simplify the management of enterprise network devices and information through the use of scripts and a scripting object model. To this end, an API is provided that transforms scripts passed from a scripting engine into the existing "low-level" COM syntax required for CIMOM queries. According to the architecture, a scripting engine receives the scripts and works with the API to translate script instructions into the COM method calls needed to access properties and methods of CIMOM objects. For example, to obtain a disk's free space, a client script may simply request "obj.FreeSpace" for that disk object, which is translated into a set of identifiers and commands that retrieve the free space of the disk via CIMOM.

In addition to providing direct access of properties and methods, the present invention involves other aspects related to scripting, including collections, events, monikers and security. Collections enable a set of objects or properties thereof to be serviced iteratively, for example, to manipulate or retrieve properties for a set of resources in simple loop. Events enable queries to be made asynchronously, such that calls return immediately, and later complete via COM event notifications. Monikers enable the simplification of strings in the script, by providing for shorthand definitions to represent a sequence of instructions in a single string. Security is provided, by emulating the ability to set security.

Other advantages will become apparent from the following detailed description when taken in conjunction with the drawings, in which:

DETAILED DESCRIPTION

EXEMPLARY OPERATING ENVIRONMENT

Figure 1:
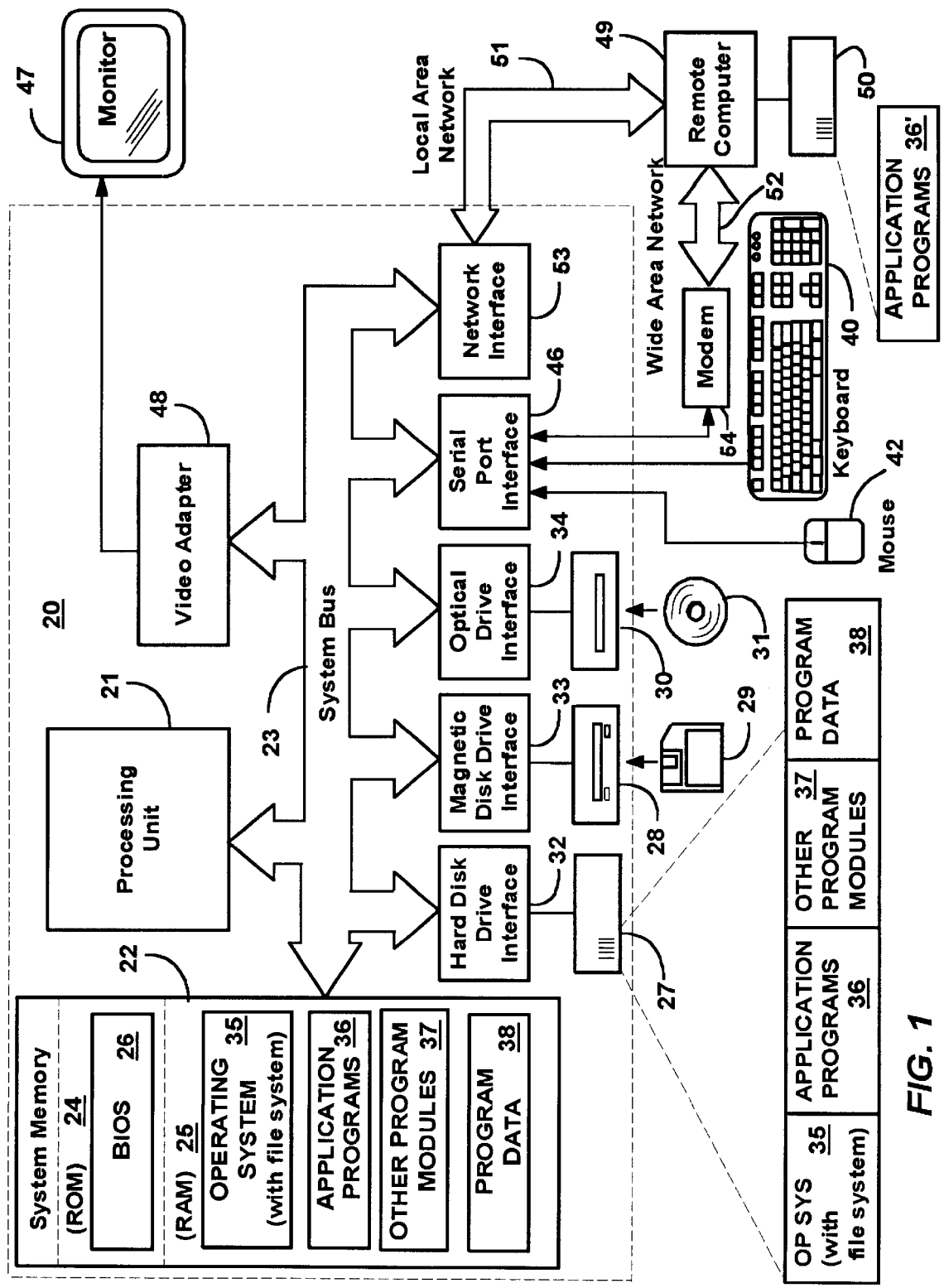
FIG. 1 is a block diagram representing a computer system into which the present invention may be incorporated.

FIG. 1 and the following discussion are intended to provide a brief general description of a suitable computing environment in which the invention may be implemented. Although not required, the invention will be described in the general context of computer-executable instructions, such as program modules, being executed by a personal computer. Generally, program modules include routines, programs, objects, components, data structures and the like that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (preferably Windows 2000), one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

THE COMMON INFORMATION MODEL

By way of general background, in a common information model (CIM) installation 60 (FIG. 2), a process acting in the role of a client 62 makes management requests, while a process acting as a server, i.e., a CIM object manager, or the CIMOM 64, satisfies each request via one or more providers $66_1$–$66_n$ and returns an appropriate response via uniformly rendered managed objects. CIM and the CIMOM 64 are further described in the aforementioned U.S. patent application Ser. No. 09/020,146, assigned to the assignee of the present invention, and hereby incorporated by reference herein.

Figure 2:
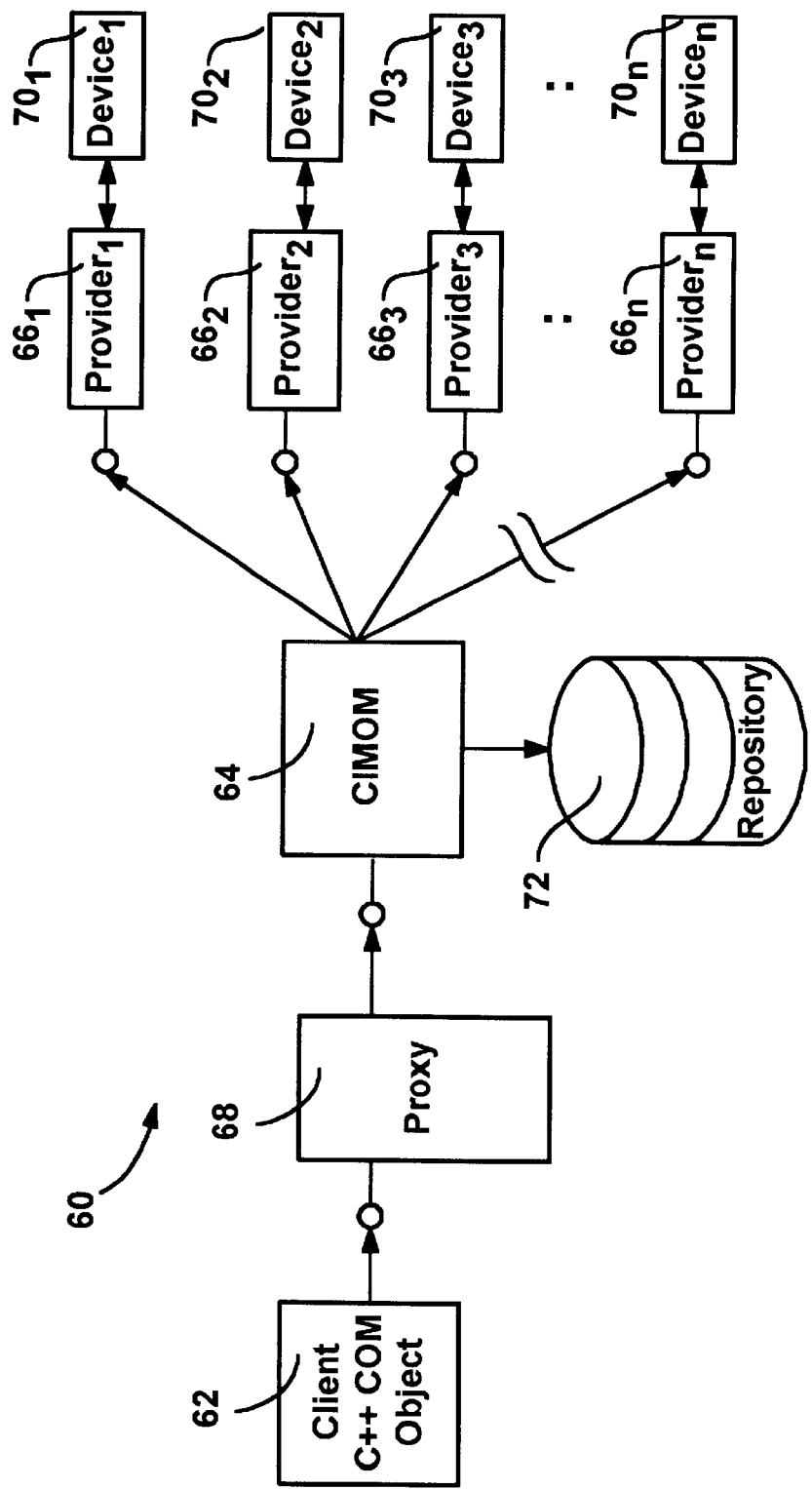
FIG. 2 is a block diagram generally representing a general architecture of the common information model for working with management information according to the prior art.

As shown in the CIM installation 60 of FIG. 2, the client process 62 (e.g., a management application) communicates management information requests through a proxy 68 to the CIMOM 64. At least part of the communication is preferably via COM (Component Object Model) and/or DCOM (Distributed Component Object Model), i.e., by invoking methods of objects in the CIMOM 64 server over an underlying protocol such as TCP, however any suitable interprocess communication mechanism may be alternatively employed. For example, the client process 62 may communicate with the CIMOM 64 using the HyperMedia Management Protocol (HMMP). HMMP provides management services across platform boundaries by defining a common network access model, a common schema, and a common security model. Both DCOM and HMMP are well-documented, and as will become apparent below, are not necessary to the present invention, as any protocol capable of passing object information may be used. As such, for purposes of simplicity, DCOM and HMMP will not be described in detail herein.

By way of example of how management information is exchanged, in FIG. 2, the client process 62 starts a request, which is appropriately packaged up by the proxy 68. The request is received by the CIMOM 64. The CIMOM 64 is a server which implements a large subset of the communication protocol, and which switches roles so as to act as a proxy 68 on behalf of client process 62 requests. As part of its function, the CIMOM 64 passes the client process 62 requests to one or more appropriate servers known as object providers (or simply providers) $68_1$–$68_n$. Providers are the sources of management information, and typically obtain their information directly from a system resource such as a hardware device or database, although a provider may obtain some of its provided information from another provider, e.g., via the CIMOM 64. By way of example, one type of provider (e.g., $68_2$) may be implemented in a software driver or the like supplied by a vendor to accompany a hardware device $70_2$ such as a disk drive.

In order to service a request, the CIMOM 64 accesses a CIM repository (database) 72 in order to determine which object provider or providers to contact (if any). More particularly, when the client process 62 sends a request to the CIMOM 64, the client process 62 will access the CIM repository 72, which may have the information therein if static, and/or will provide the information necessary for locating the appropriate provider or providers which can satisfy the request. Thus, the CIMOM 64 will either directly satisfy a request or in essence become a client process itself and forward the request to an appropriate provider 68.

Through the CIMOM 64, client processes are relieved of the burden of locating and directly managing a multitude of devices on the network. Instead, the CIMOM 64 hides the management complexity by distributing the request to the appropriate providers 66. The providers $66_1$–$66_n$ gather the necessary data from the devices $70_1$–$70_n$ using vendor or protocol-specific mechanisms such as DMI, SNMP, CMIP or a proprietary mechanism, and return the data to the requesting the CIMOM 64.

Providers are components (e.g., dynamic link libraries, or DLLs) which are essentially more primitive in nature than the CIMOM 64 itself. As a result, in order for the CIMOM 64 to present uniform capabilities to the client process 62, the CIMOM 64 may simulate any operations not directly supported by a provider, by executing more and more primitive requests until a request is understood by the provider. The CIMOM 64 then synthesizes the results and returns them to the client process 62 as though the provider or providers had been capable of the original complex request submitted by the client process 62.

By way of example, if a client process 62 submits a query to the CIMOM 64 requesting information on a disk drive, the CIMOM 64 may return an instance of the following "Disk" class object thereto:

```
{
    Volume = "DISKC";
    FileSystem = "XFS";
    TotalCapacity = 240000000;
    Freespace = 180000000;//Dynamically supplied by provider
};
```

Note that since the FreeSpace parameter is highly volatile, in a typical implementation the value would be supplied by a provider 68, rather than being a stored or static value. The CIMOM 64 is capable of retrieving both the static and dynamic information from various sources including the CIM database 72 and/or appropriate providers such as $68_2$, and returning the object instance to the client process (application) 62.

The CIMOM 64 is capable of receiving potentially high level SQL queries, decomposing those queries as necessary, and communicating with a variety of sources, possibly in a series of very primitive operations, to produce a result. The operations are transparent to the client process 62, as the result is returned in the same manner regardless of the sources that supplied the information. For example, a query such as—select from LogicalDisk where FreeSpace<20000000—intends to have returned only instances that meet the less than twenty megabyte criteria, and not all instances of the LogicalDisk class. If the provider or providers of this information are unable to limit their retrieval based on this criteria, the CIMOM 64 provides the correct result set by a post-retrieval filtering operation. The CIM object manager thus performs operations that complement the capabilities of providers in order to uniformly render managed objects to management applications. Because some providers have substantially more capabilities than other providers, the CIMOM 64 attempts to operate each provider with its maximum capabilities, lowering its level for requesting information from a provider until the provider can satisfy the request, e.g., by reducing the complexity of a query for that provider.

SCRIPTING FOR SYSTEM INFORMATION

As described above, the CIMOM 64 provides interfaces for accessing via a COM object to query for and otherwise access system information. The present invention essentially wraps those interfaces to present them as a suitable object model for scripting in a uniform way that is usable by contemporary scripting languages. The object model and scripting API 74 (application programming interface) for wrapping the interfaces are described below.

Figure 3:
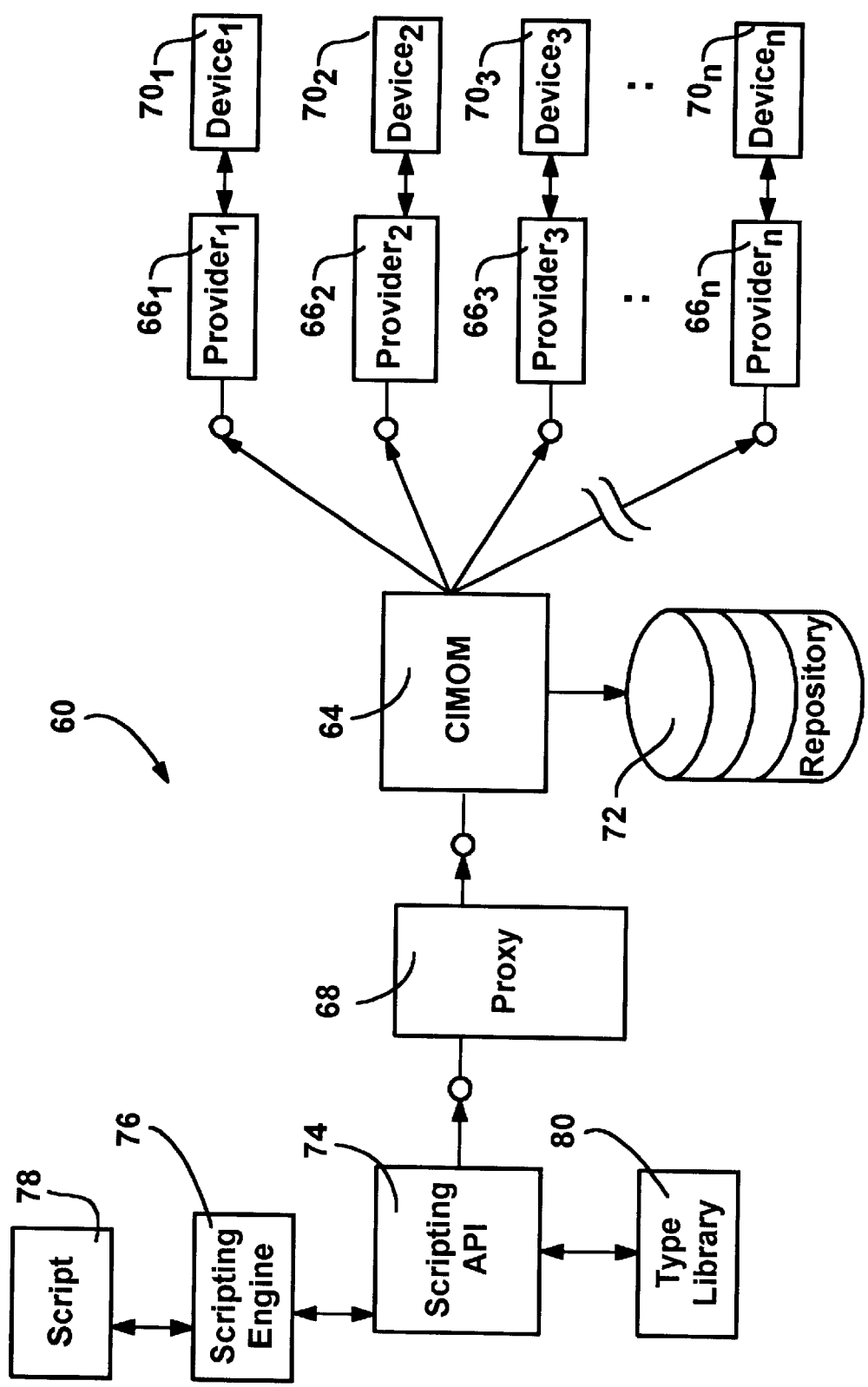
FIG. 3 is a block diagram generally representing a general architecture for accessing system information via a script in accordance with an aspect of the present invention.

Thus, in accordance with one aspect of the present invention, there is provided a method and system that transform script written in a straightforward, natural syntax into the COM calls and appropriate syntax needed to directly access properties and methods of CIM (or WBEM, i.e., Web-based Enterprise Management) objects. To this end, as shown in FIG. 3, a scripting API 74 is provided whereby a scripting engine 76 interpreting a script 78 calls the API 74 to access the information. The API 74 may be implemented as a dynamic link library (DLL).

By way of example, to directly access a CIM object's property such as the free space on a disk volume named "C:," a script may simply request:

obj=Svc.Get("Disk="C:"") value=obj.FreeSpace.

As can be readily appreciated, this straightforward two-line request intuitively matches what a scriptwriter desires, i.e., the retrieval of an object, and then the value of a property on that object. The more complex transformation to that required by the CIMOM 64 is performed in the scripting API 74. Note that the accessible objects and properties are known to the scriptwriter from a published schema. Further, in addition to retrieving property values, note that CIM objects may have property values set therefor, and CIM objects may have methods called via the script.

In the above example, the first line is translated to create a locator object and obtain a services object from the locator object by calling a "ConnectServer" method of the locator object. Note that this script fragment assumes that a "services" object has already been created and that a reference to it is stored in the variable called "Svc". Then, the scripting API 74 returns an identifier corresponding to the svc.Get function to the scripting engine 76. To this end, the scripting API 74 analyzes the string "svc.Get" to determine that it corresponds to a set of interfaces having a static value, and looks up this value (i.e., "7") from a type library 80 of the interfaces. Note that from the perspective of the scripting engine 76, the scripting engine 76 simply passes in a string and receives an ID in return.

Figure 4:
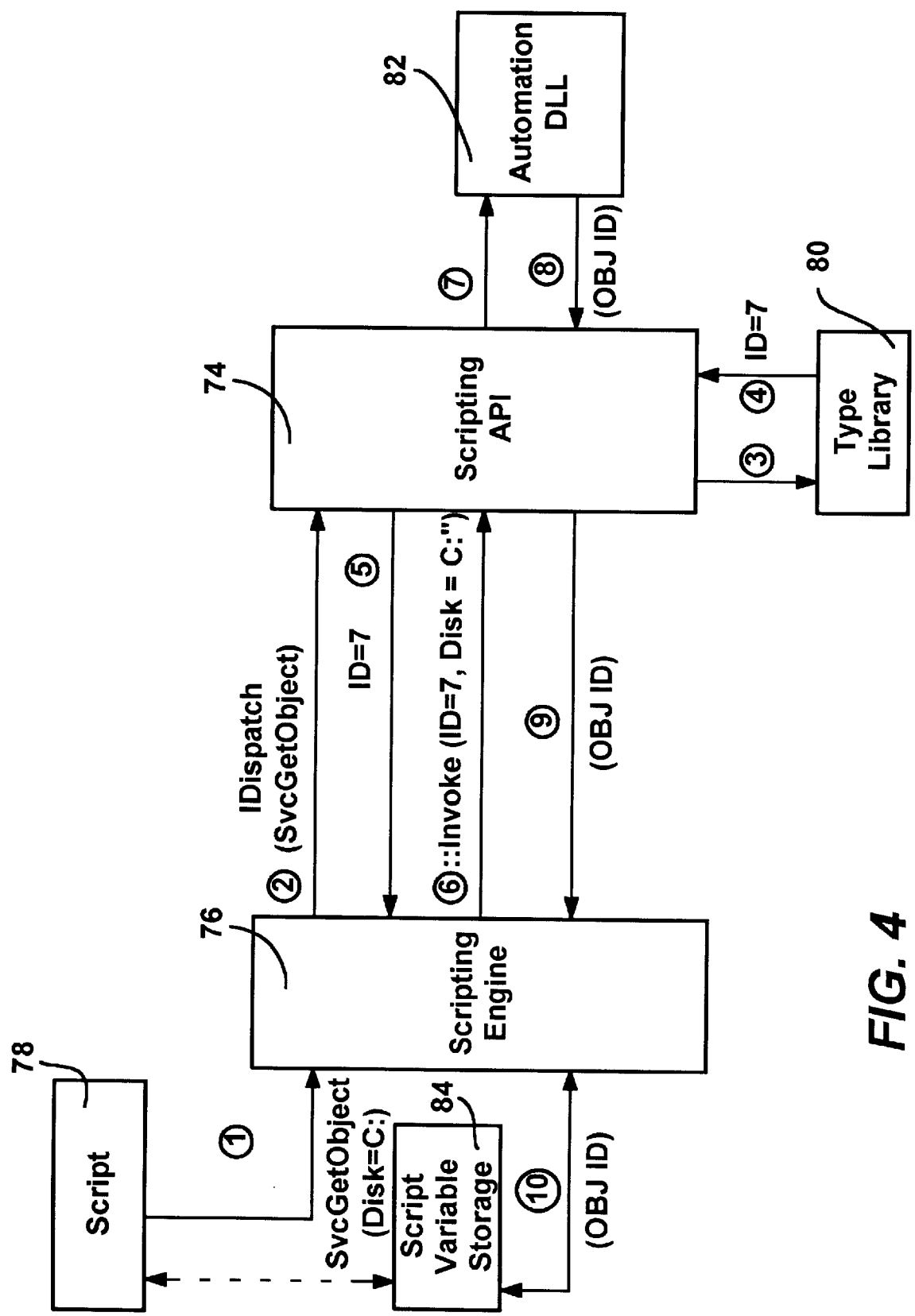
FIG. 4 is a block diagram generally representing an operation of the present invention to return an object when requested in a script in accordance with an aspect of the present invention.

These above actions are generally represented in FIG. 4 by circled numerals one (1) through five (5), wherein beginning at numeral (1), the scripting engine 76 interprets the script—obj=Svc.GetObject("Disk=C:"). At circled numeral (2), the scripting engine 76 calls the scripting API 74 via the well-known Idispatch mechanism, passing it the "Svc.GetObject" string as a parameter seeking an ID for this function. The scripting API 74 recognizes this string as having a static value therefor stored in the type library 80, which it looks up and retrieves as represented in FIG. 4 by circled numerals (3) and (4). The scripting API 74 returns the ID (equal to seven) to the scripting engine 76 as represented via circled numeral (5).

Once the scripting engine 76 has the ID for this function, the scripting engine 76 uses the value to call the corresponding GetObject method via the well-known "Idispatch::Invoke" function call, as represented in FIG. 4 by circled numeral (6). A parameter of "Disk=C:" is passed to identify the desired object. When the scripting API 74 receives this call, it recognizes the call as corresponding to a static parameter, (via the ID's most significant bit value of zero, as described below), whereby the call is passed essentially as is (circled numeral (7) to a well-known automation DLL 82 (OLEAUT32.dll, by calling IDispatch::Invoke on the automation DLL 82 with the same parameters. From there, the object ID of the "Disk=C:" object (class disk) is returned via the scripting API 74 and scripting engine 76 to the script 78 (e.g., a cached memory location 84 associated with the script 78 by the scripting engine 76) for use in subsequent script interpretations, as represented in FIG. 4 by circled numerals (8), (9) and (10).

Figure 5:
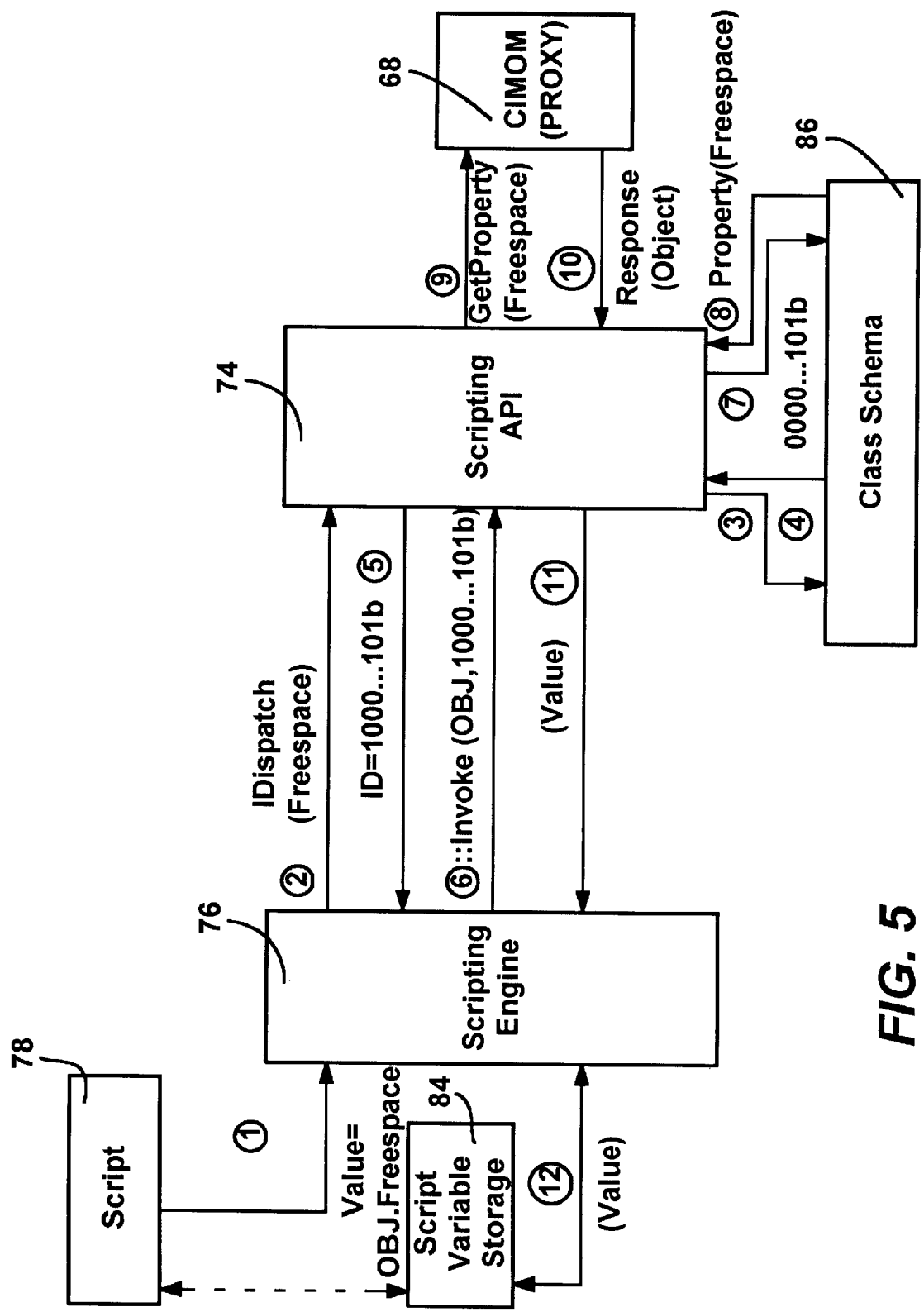
FIG. 5 is a block diagram generally representing an operation of the present invention to return a property of an object when requested in a script in accordance with an aspect of the present invention.

FIG. 5 represents a similar process to obtain the FreeSpace property value. Note that this time, however, the FreeSpace property does not have a statically defined identifier associated therewith in the type library 80. Nevertheless, as will be described below, the scripting engine 76 will merely pass in a string and receive an appropriate ID via the IDispatch mechanism, and then via the IDispatch::Invoke call, will pass in the ID and receive the desired property value. Thus, the scripting engine 76 is relatively straightforward to implement. Moreover, the single variable is compatible with limitations of some scripting languages, (e.g., Jscript), which, for example, cannot be written in a manner that enables them to (upon interpretation) directly generate the syntax required by COM.

In FIG. 5, the object ID is known, as is the ID for the GetProperty function, in the manner described above. Note that the ID for the GetProperty function may be obtained in the same manner as the static GetObject function ID. As a result, when the next script line is interpreted as requesting value=obj.FreeSpace at circled numeral (1), the scripting engine 76 can call the scripting API 74 with the appropriate information to obtain the value of FreeSpace. More particularly, as represented in FIG. 5 by the circled numeral (2), the scripting engine 76 passes the string "FreeSpace" to the scripting API 74. Upon analyzing this string, the scripting API 74 recognizes it as corresponding to a property of the class schema 86 for the "disk" class.

In keeping with the invention, the scripting API 74 dynamically generates an identifier for the FreeSpace property. For example, the scripting API 74 may number the identifier based on the alphabetic order of the property in the disk class. The scripting API 74 also sets the high bit of the (thirty-two bit) ID so as to mark it as dynamically generated (as opposed to static). In FIG. 5, circled numerals (3) and (4) represent the retrieving of the corresponding number (e.g., alphabetic order) from the class store, wherein 0000 represents the high bits 31 through 28, the ellipsis ( . . . ) represents bits 27 through 3, and 101b represents bits 2 through 0 (in binary). Thus, in the hypothetical example herein, the FreeSpace property has a value of five, which is returned to the scripting engine 76 as the ID for FreeSpace, after setting the most significant bit (1000 . . . 10b) as represented in FIG. 5 by circled numeral (5). Note that this makes the scripting API 74 extensible, as the scripting API 74 can provide IDs for new objects added to the schema 86 over time.

Once the scripting engine 76 has the ID for this property, the scripting engine 76 uses the ID to call the corresponding GetProperty method via the well-known "Idispatch::Invoke" function call, as represented in FIG. 5 by circled numeral (6). The object ID for Disk C: is passed as a parameter to identify the desired object, as is the value of the FreeSpace ID that was just returned. When the scripting API 74 receives this call, it recognizes the call as corresponding to a dynamic parameter, (via the ID's most significant bit, set to one), whereby the ID is used to lookup the correct property in the disk C: object, i.e., the FreeSpace property. Note that from the above example, this mapping of a string to an ID, and then reverse mapping the ID to the property may seem redundant, however IDs are more efficient than string interpretation, and the scripting API 74 does not assume the purpose for which the scripting engine 76 is requesting the ID. Moreover, the scripting engine 76 may cache returned IDs for numerous queries and the like without having to repeatedly ask for the same ID, e.g., a script may request the FreeSpace of disk C: more than once, yet the scripting engine 76 only need obtain the various IDs once. Nevertheless, it is feasible for the scripting API 74 to cache an ID/property (or ID/method) relationship in anticipation of its subsequent use, to thereby speed up the reverse mapping process. It is also feasible for the scripting engine 76 to pass a string and receive a result from the scripting API 74 without ever receiving the ID, since the scripting API 74 could use the IDs to generate its own Invoke calls, essentially handling some of the functionality performed by the scripting engine 76.

Figure 6:
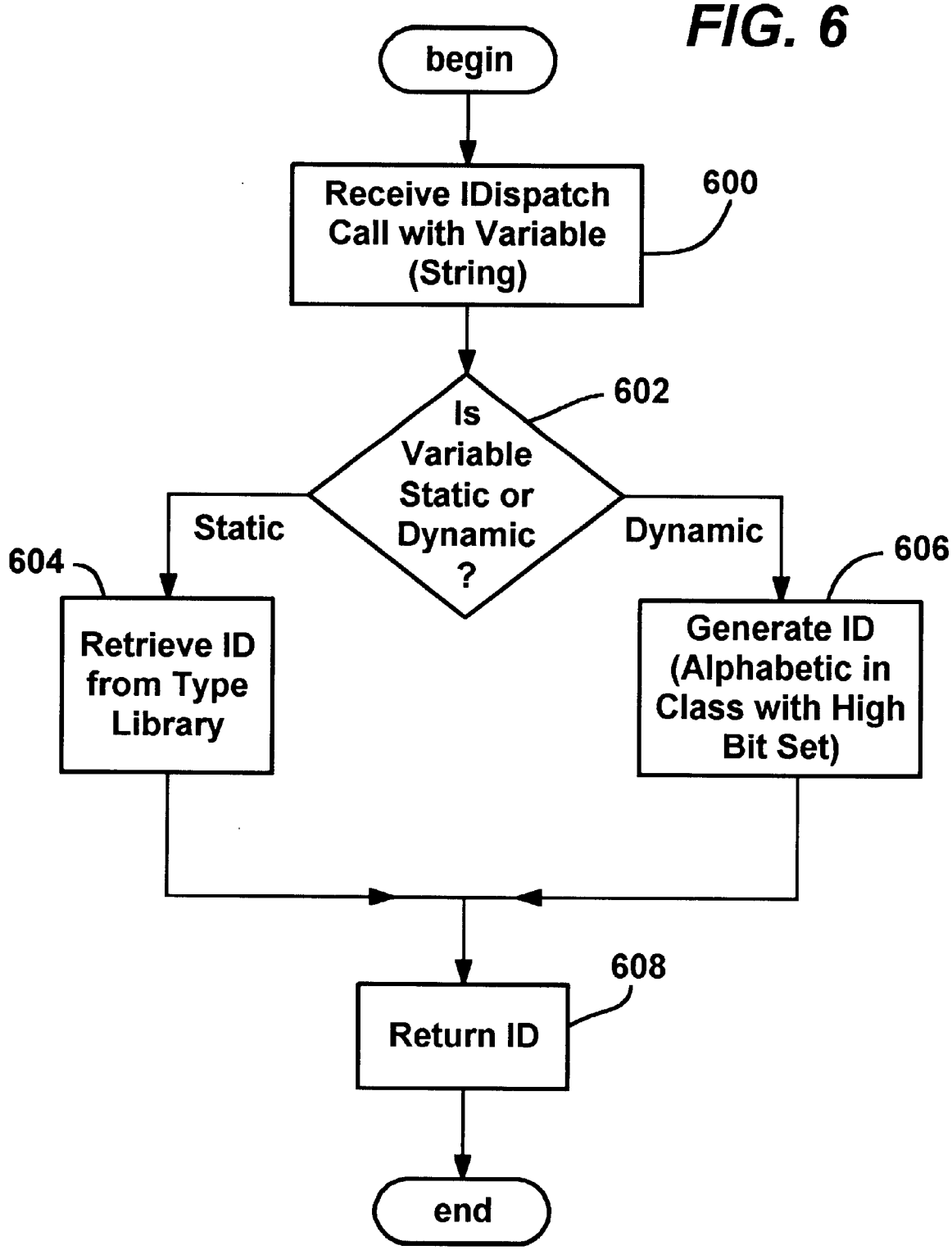
FIG. 6 is a flow diagram generally representing a process performed by a scripting API to return an identifier when provided with a string via a scripting engine in accordance with an aspect of the present invention.
Figure 7:
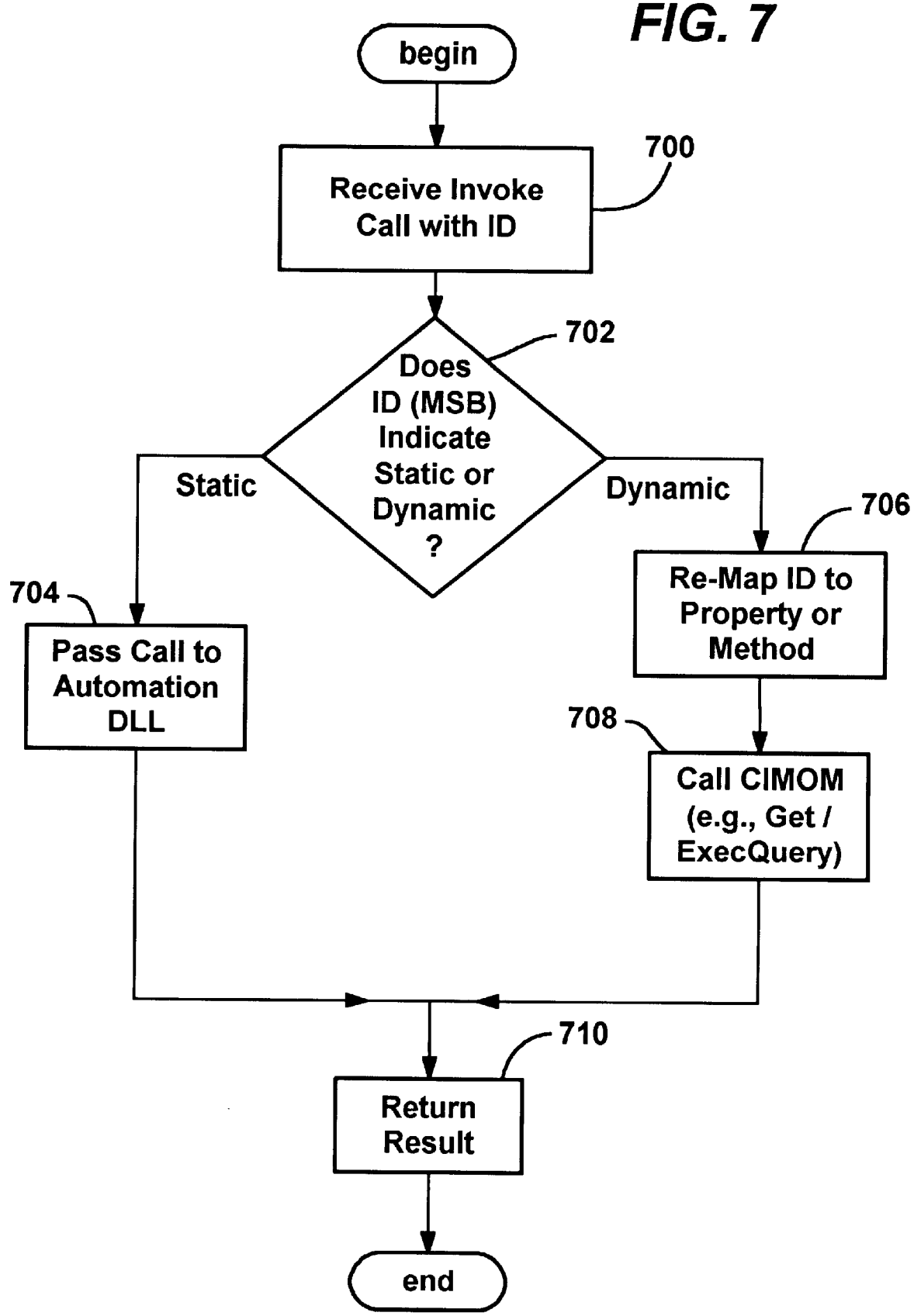
FIG. 7 is a flow diagram generally representing a process performed by a scripting API to return an property or method when provided with an identifier via the scripting engine in accordance with an aspect of the present invention.

With the above information, the scripting API 74 contacts the CIMOM 64 (via the proxy 68) using the appropriate COM syntax—Obj.GetProperty("FreeSpace", value, flavor)—, whereby the CIMOM 64 returns the value, as represented by circled numerals (9)–(12) in FIG. 5. In this manner, a script 78 is able to obtain information from the CIMOM 64 using a straightforward syntax in a very intuitive manner, i.e., an "object.property" (dot notation) syntax. The scripting API 74 handles the translation to the syntax understood by the CIMOM 64, FIGS. 6 and 7 are flow diagrams that summarize the processes performed by the scripting API 74 and described above. In FIG. 6, the scripting API 74 is given a string from the scripting engine 76 via the IDispatch mechanism, as represented at step 600. At step 602, the scripting API 74 analyzes the string and determines whether it corresponds to a static method or dynamic method or property. If static, an ID corresponding thereto is returned from the type library 80 at step 604. If dynamically generated, step 606 is instead executed to generate the ID, such as from its alphabetic property or method position in the object class, and also by setting the most significant bit of the ID. Whether static or dynamic, the ID is returned to the scripting engine 76 at step 608.

In FIG. 7, the ID is known, and passed from the scripting engine 76 via the IDispatch::Invoke call, as represented at step 700. At step 702, the ID is evaluated to determine whether it corresponds to a static method or dynamic method or property. If static, the call is passed to the automation DLL 82 (by calling IDispatch::Invoke of the automation DLL 82 with the same parameters) at step 704, and the result returned at step 710. If dynamically generated, step 706 is instead branched to by step 702, whereby the property is determined by reverse mapping from the ID (after masking off the most significant bit) as described above. The CIMOM 64 is then called at step 708 to obtain the property value, and the result returned at step 710.

THE WBEM SCRIPTING OBJECT MODEL

Figure 8:
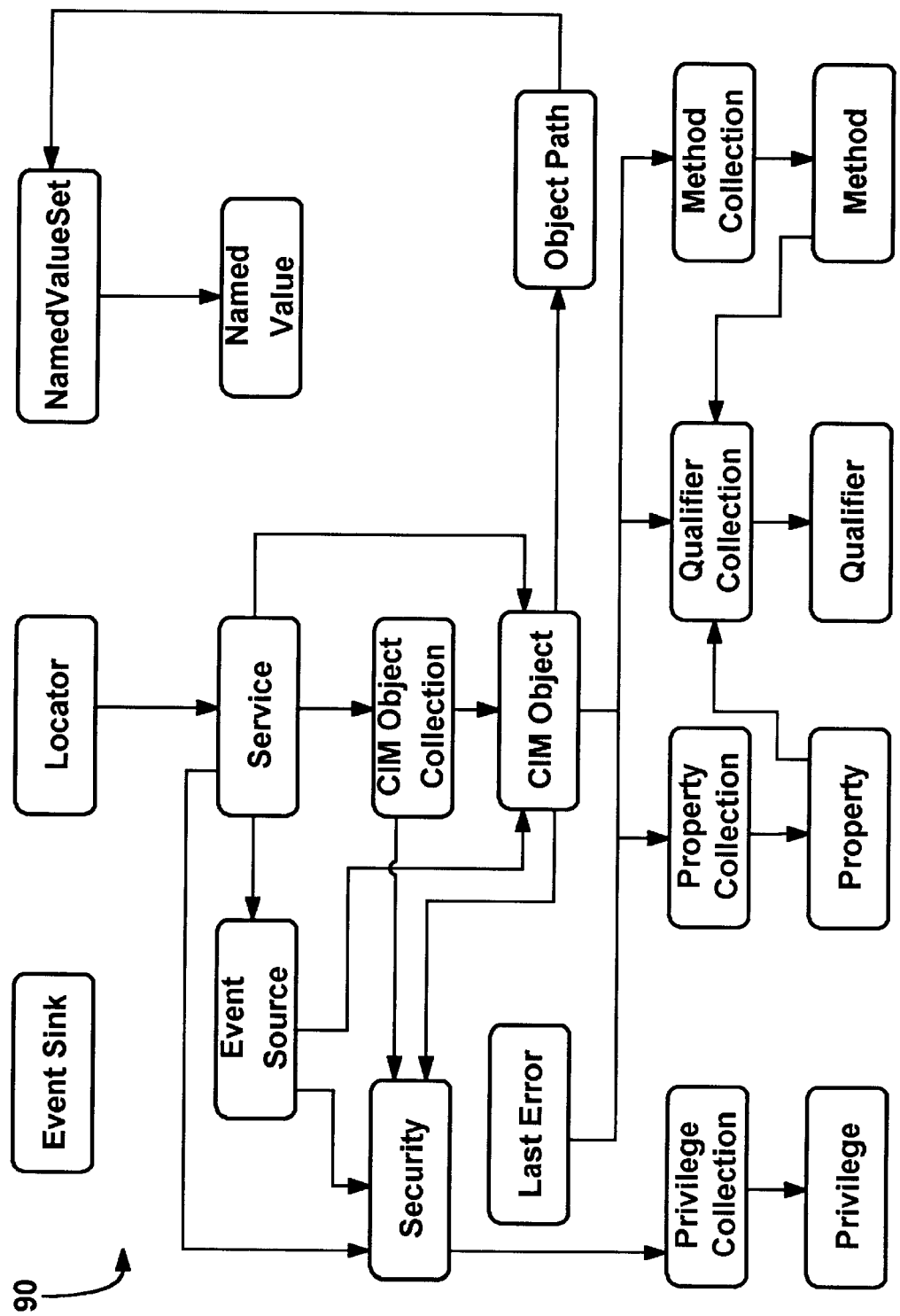
FIG. 8 is a block diagram generally representing various objects of a Scripting Object Model of the present invention, and relationships between those objects.

FIG. 8 represents the principal objects and their relationships within the WBEM Scripting Object Model 90, wherein the boxes within the diagram represent objects in the scripting model 90. The Event Sink, Locator, NamedValueSet, Service, Last Error, CIM Object and Object Path objects represent objects which can be created directly by the scripting API 74. Note that the Locator object is created using conventional methods for creating coclasses, while the other objects can be created using Moniker display names, described below. Further, note that the SWbemNamedValueSet, SWbemObjectPath, SWbemLastError and SWbemSink objects are also coclasses and accordingly may be directly created. The NamedValueSet, CIM Object Collection, Privilege Collection, Property Collection, Qualifier Collection and Method Collection objects represent Automation Collection objects. In FIG. 8, an arrow from one object (e.g., the Locator Object) to another object (e.g., the Service Object) indicates that the object (the Locator object) can obtain the other object (the Service object) from a call to that object (the Locator object) via the Scripting API 74 relationship.

The Locator Object represents a WBEM locator, and is directly creatable as a coclass. The locator object has only one method, ConnectServer, which is the means of obtaining a Service object. It has the following properties:

| Name | Type | Purpose | Access |
|---|---|---|---|
| Security_ | Security | Return the Security object for this Locator object | Read-only |

This property allows security attributes to be associated with a SWbemLocator, used for the purposes of defining Privilege on operating systems prior to the first ConnectServer call. As can be appreciated, security is important because a user Can access objects in CIMOM for example, to format a hard drive. Accordingly, CIMOM limits access based on user identity, and also audits operations. Further, sensitive information is sometimes exchanged via DCOM, whereby encryption is used, and sometimes users need to switch on certain privileges to perform certain operations.

As described below, because there is no way to directly expose the IWbemServices security interface of CIMOM to a script, the scripting API 74 emulates the ability to set security via script by providing SWbemServices, a scriptable version of IWbemServices, to expose security properties. Moreover, security emulated for one object may be applied across other objects, e.g., if one object is encrypted, the script does not have to specify others for encryption, as it is performed therefor.

As also described below, the extension to security further enables a scriptwriter to specify privilege information in a timely manner. Note that the Impersonation and Authentication properties of SWbemSecurity are not directly applicable to SWbemLocator (there is no remote proxy). However they will be propagated to any child SWbemServices objects in the normal manner, thereby providing a useful mechanism for defining global settings for these properties.

The Event Sink Object represents a sink for WBEM events, and is used for asynchronous API calls, described below. It is directly creatable as a coclass. It supports the following methods:

| Name | Purpose |
|---|---|
| Cancel | Cancel all outstanding asynchronous calls bound to this object instance. |

The sink supports the following events:

| Name | Purpose |
|---|---|
| OnObjectReady | Called when CIM Object returned from asynchronous call |
| OnCompleted | Called when asynchronous call completed. |
| OnProgress | Called to report progress of asynchronous call. |
| OnPut | Called when CIM Object is saved following an asynchronous Put call. |

The Service Object represents an authenticated connection to a namespace. It has a single automation property:

| Name | Type | Purpose | Access |
|---|---|---|---|
| Security_ | Security | Return the Security object for this Services object | Read-write |

The Services object supports the following automation methods, in both synchronous and asynchronous form:

| Name | Purpose |
|---|---|
| Get | Retrieve a CIM Class or Instance. |
| Delete | Delete a CIM Class or Instance. |
| SubclassesOf | Enumerate subclasses of a CIM Class. |
| InstancesOf | Enumerate instances of a CIM Class. |
| ExecQuery | Execute a WQL query. |
| ExecNotificationQuery | Execute a WQL notification query, returning an Event Source. |
| ExecMethod | Execute a method on a CIM Instance or Class. |
| AssociatorsOf | Retrieve associators of a CIM Instance or Class. |
| ReferencesTo | Retrieve references to a CIM Instance or Class. |

The Event Source Object represents a source of events obtained from WBEM, and is returned by the ExecNotificationQuery method of the Service object. It has a single automation property:

| Name | Type | Purpose | Access |
|---|---|---|---|
| Security_ | Security | Return the Security object for this Event Source object | Read-write |

It supports the following methods:

| Name | Purpose |
|---|---|
| NextEvent | Get the next event from the source (or timeout) |

The Object Path Object is a helper object that can be used to construct WBEM object paths without the user requiring to know the details of the Object Path syntax. This object supports the following automation properties:

| Name | Type | Purpose | Access |
|---|---|---|---|
| Path (DEFAULT) | BSTR | The full WBEM path | Read-write‡ |
| RelPath | BSTR | The relative (to namespace) path | Read-write‡ |
| Server | BSTR | The server name | Read-write‡ |
| Namespace | BSTR | The namespace path | Read-write‡ |
| ParentNamespace | BSTR | The parent namespace | Read-only |
| DisplayName | BSTR | The moniker-style display name | Read-write‡ |
| Class | BSTR | The name of the Class | Read-write |
| IsClass | BOOL | Whether the path addresses a class | Read-only |
| IsSingleton | BOOL | Whether the path addresses a singleton instance | Read-only |
| Keys | Named Value Set | The set of key value bindings for this path | Read-only |
| Security_ | SWbemSecurity | Defines the Security component of the path. | Read-only |
| Locale | BSTR | Defines the Locale component of the path | Read-write‡ |
| Authority | BSTR | Defines the Authority (Principal) component of the path | Read-write‡ |

Note that the NamedValueSet object is immutable, but can be cloned to provide a mutable copy. Further, note that when the SWbemObjectPath is returned as the Path_ property of a SWbemObject, the above Read-Write properties marked (‡) become Read-Only. Read-only means that the Property cannot be set, but methods can be called on the collection which will modify the contents thereof. Also, the term DEFAULT is applied to a property or method to indicate that it is the "Dispatch Default" property/method on an automation object. This means that the property name can be omitted, e.g., the following VBScript fragment "WScript.Echo MyObjectPath" where MyObjectPath is an Object Path object, would output the value of the Path property of an Object Path.

The Security_ property allows security attributes to be associated with an SWbemObjectPath, whereby scriptwriters may build object paths containing Privilege override information without requiring the scriptwriters to know how to build strings from scratch. Note that this property does not affect the runtime security behavior of the SWbemObjectPath of which it is a member, but is there solely to allow security information to be specified easily when defining a path. Further, note that when the SWbemObjectPath is returned as the Path_ property of an SWbemObject, the Security_ property of the object path is immutable. This is consistent with the immutability of the Path_ property value currently enforced by the scripting API 74.

The Object Path Object supports the following methods:

| Method | Purpose |
|---|---|
| SetAsClass | Coerce the path to address a Class |
| SetAsSingleton | Coerce the path to address a Singleton Instance |

The Named Value Set Collection is a collection object, each of whose elements is a CIM Named Value. A collection object is a type of Automation Object that provides built-in support for certain iterative constructs used by VB and VBScript. For example, a collection can be used in a VB "for each I in C" statement. Use of collections makes for a simpler and more natural programming style. The Named Value Set Collection is used to model a collection of named values that may be passed as additional information to a method of the Services or Locator objects, and it supports the Collection properties Count and _NewEnum. It also supports the standard Collection methods (Add, Item and Remove), as well as the DeleteAll method. The Item implementation allows the use of the value name as the indexing mechanism for the collection, e.g., it is possible to use WbemNamedValueSet("foo") in VB or VBScript as a concise means of referring to the element of the WbemNamedValueSet whose name is "foo," (i.e., as a shorthand for WbemNamedValueSet.Item("foo")). The GetNames method from the COM API is not supported, as this can be accomplished using other API calls, and thus is omitted in the interests of keeping the API as small and as simple as possible.

The Named Value Object is used to model a named value (a combination of a name and a VARIANT value). Named values are collected in a WbemNamedValueSet object. The Named Value object supports the following automation properties:

| Name | Type | Purpose | Access |
|---|---|---|---|
| Name | BSTR | The name of the value. | Read-only |
| Value | VARIANT | The value. | Read-write |

The CIM Object Collection is a collection object, each of whose elements is a CIM Object. It is used to model the result set associated with an enumeration or query, and supports the Collections property _NewEnum and Count. The CIM Object Collection supports the Collection method Item, where the index supplied is the relative path of the object, and further supports the Security_ property, which returns the Security object for the Collection. It does not support the optional Collection methods (Add and Remove). This object also supports the WBEM Clone method.

The CIM Object is used to represent a single CIM Instance or Class. CIM properties (those which would appear in a Managed Object Format (MOF), but not WBEM system properties and methods, are exposed in one of two ways. A first way is directly via the "dot" (object.property or object.method) notation as automation methods and properties of this interface. This is extremely convenient for scripts written to manipulate specific CIM objects. A second way is indirectly, via the property and method collections available from this object, required for "schema browser"-type scripts which deal with objects generically.

The CIM Object supports the following automation properties (wherein the trailing "_" is used to help guarantee uniqueness of names):

| Name | Type | Purpose | Access |
|---|---|---|---|
| Derivation_ | SAFFARRAY of VARIANT | An array of class names (possibly empty) describing the derivation hierarchy. The first (lowest-index) member of the array is the _SUPERCLASS, and the last is the DYNASTY. | Read-only |
| Path_ | Object Path Object (section 0) | Location and naming information for the CIM Object. | Read-only |
| Qualifiers_ | Qualifier Collection | Object-level qualifiers | Read-only |
| Properties_ | Property Collection | Object properties | Read-only |
| Methods_ | Method Collection | Object methods | Read-only |
| Security_ | Security | Return the Security object for this Object | |

Note that the single Derivation_ automation property encompasses three "system" properties exposed in the C++ COM API, namely _DERIVATION, _DYNASTY and _SUPERCLASS. Further, note that the single Path_ automation property encompasses six "system" properties exposed in the C++ COM API—_GENUS, _CLASS, _SERVER, _NAMESPACE, _RELPATH and _PATH. Following the paradigm of that API, only the Class automation property of this Object is write-able.

It also should be noted that "system" properties are exposed in the scripting API 74 as automation properties of the CIM Object, rather than true CIM properties. In addition the _PROPERTY_COUNT system property is exposed as the standard Count property of the Property Collection Object (section 0).

The CIM Object supports the following methods (wherein the underscore is again used for uniqueness), and wherein the methods marked with an asterisk have additional asynchronous (described below) equivalents:

| Name | Purpose |
|---|---|
| Clone | Create a copy of this object. |
| GetObjectText_ | Retrieve MOF representation of this object. |
| SpawnDerivedClass_ | Create a subclass object. |
| SpawnInstance_ | Create an instance Object. |
| CompareTo_ | Compare with another Object. |
| Put_ * | Submit the object to CIMOM |
| Delete_ * | Delete the object from CIMOM |
| ExecMethod_ * | Execute a method on the object |
| Instances_ * | Enumerate instances of the object (object is a class) |
| Subclasses_ * | Enumerate subclasses of the object (object is a class) |
| Associators_ * | Enumerate associators of the object |
| References_ * | Enumerate references to the object |

The CIM Object serves a dual purpose, namely to allow the user to specify CIM properties and methods via the natural dot "." notation as described above, and to give users access to meta-information (such as the class name). Because there is a potential for name clashes between automation properties and methods which model meta-information, and those that model corresponding CIM properties and methods. In order to avoid this clash, certain conventions have been adopted, i.e., meta-information names have an appended single underscore ("_") character (e.g., Qualifiers_). Note that the use of the underscore as the final character in a WBEM element name is disallowed in at least one implementation.

The Last Error Object is a CIM Object that is directly creatable, and may be used to return the last WBEM extended error object (of any) generated on the current thread (in all the current scripting environments there is only one thread). The object has read-once semantics, i.e., it is cleared after reading. The Last Error Object is used to provide similar functionality to the GetLastError call in the Win32 API.

The Qualifier Collection Object is a collection object, each of whose elements is a Qualifier Object. It represents the set of qualifiers attached to a CIM element (class, instance, property or method). It supports the standard Collection methods (Add, Item and Remove), and the standard Collection properties (Count and _NewEnum). The Item implementation allows the use of the qualifier name as the indexing mechanism for the collection. The GetNames method from the COM API is not supported, as this can be accomplished using other API calls and has thus been omitted for simplicity.

The Qualifier Object represents a qualifier, and has the following automation properties:

| Name | Type | Purpose | Access |
|---|---|---|---|
| Name | BSTR | Qualifier name | Read-only |
| Value (DEFAULT) | Variant | Qualifier value | Read-write |
| IsLocal | BOOL | Whether the qualifier is local to the owning object, or has been propagated | Read-only |
| PropagatesToSubclass | BOOL | Controls the propagation behavior to subclasses | Read-write |
| PropagatesToTnstance | BOOL | Controls the propagation behavior to instances | Read-write |
| IsOverridable | BOOL | Determines whether the qualifier may be overridden when propagated | Read-write |
| Origin | BSTR | Originating class name | Read-only |
| IsAmended | BOOL | Whether the Qualifier has been amended (localized) using a merge operation | Read-only |

The Property Collection Object is a collection object, each of whose elements is a Property Object. It represents the set of properties attached to a CIM element (class or instance). It supports the standard Collection methods (Add, Item and Remove), and the standard Collection properties (Count and NewEnum). Note that the Add and Remove methods are not supported on an Instance. The Item implementation allows the use of the property name as the indexing mechanism for the collection.

The GetNames method of the COM API is not supported, as this can be accomplished using other API calls, and thus has been omitted in the interests of keeping the API as small and as simple as possible.

The Property Object represents a property. It has the following automation properties:

| Name | Type | Purpose | Access |
| --- | --- | --- | --- |
| Name | BSTR | Property name | Read-only |
| Value (DEFAULT) | Variant | Property value | Read write |
| IsLocal | BOOL | Whether the property is local to the owning object, or has been propagated | Read-only |
| Origin | BSTR | Originating class name | Read-only |
| Qualifiers | Collection | Property qualifiers | Read-only |
| CIMtype | WbemCimtypeEnum | CIM type of property (not including the "array"-ness) | Read-only |
| IsArray | BOOL | Determines whether the property is an array type | Read-only |

The Qualifiers_ collection is a Qualifier Collection Object (the trailing underscore has been retained for consistency with the CIM Object naming of the analogous automation property). Note that Read-Only means that the automation property is read-only, but not necessarily the contents of that property, in the case that the property represents a collection.

The Method Collection Object is a collection object, each of whose elements is a Method Object. It represents the set of methods attached to a CIM element (class or instance). Due to a feature of the underlying WBEM COM API, this collection is always empty on an instance. In addition, the Add method is not supported on an instance. The Method Collection Object supports the standard Collection method Item. The Add and Remove methods are not supported, as this is essentially a read-only collection. The Item implementation allows the use of the method name as the indexing mechanism for the collection. The standard Collection properties _NewEnum and Count are supported.

The Method Object represents a method, and has the following automation properties:

| Name | Type | Purpose | Access |
| --- | --- | --- | --- |
| Name | BSTR | Method name | Read-only |
| Origin | BSTR | Originating class name | Read-only |
| Qualifiers_ | Qualifier Collection | Method qualifiers | Read-only |
| InParameters | CIM Object | In parameters definition | Read-only |
| OutParameters | CIM Object | Out parameters definition | Read-only |

Note that the qualifiers_ collection is a Qualifier Collection Object (the trailing underscore has been retained for consistency with the CIM Object naming of the analogous automation property).

The Security Object represents the DCOM security attributes on an Object, exposed as a property on any Object in the API that supports remote access to Windows Management services. Currently the object types that support remote access are Locator (SWbemLocator), CIM Object (SWbemObject), CIM Object Collection (SWbemObjectSet), Services (SWbemServices) and Event Source (SWbemEventSource). The above objects surface the Security object as a property called Security_. This subset of objects is referred to as "Securable objects".

The Security object supports the following automation properties:

| Name | Type | Purpose | Access |
| --- | --- | --- | --- |
| ImpersonationLevel | WbemImpersonationLevelEnum | Defines the DCOM impersonation level for the object | Read-write |
| AuthenticationLevel | WbemAuthenticationLevelEnum | Defines the DCOM Authentication level for the object | Read-only |
| Privileges | SWbemPrivilegeSet | Defines the set of Privilege overrides in effect for operations on this object. | read-only |

Read only for privileges means that the property cannot be set, but methods can be called on the collection which will modify the contents thereof. In the case of ImpersonationLevel and AuthenticationLevel, the value of the property is an enumeration type, the members of which correspond precisely to the values supported by the standard DCOM security method IClientSecurity::SetBlanket. Internally the SWbemPrivilege object will store the LUID (Locally Unique Identifier) of the Privilege, for efficiency of implementation as this is the means by which the Privilege is identified to AdjustTokenPrivilege ( ). Note that the same propagation rules apply to this property as to other properties of the SWbemSecurity, i.e., the Privilege set is copied from object A to object B as a result of a Scripting API 74 call on object A that returns object B; thereafter, the Privilege Set of object B is independent of object A.

The API exposes these security attributes because there is no "generic" support for DCOM security configuration in an automation environment that is analogous to the IClientSecurity interface provided by DCOM in "raw" non-automation environments. Also, impersonation is an important feature of Windows Management that requires client-side configuration to work correctly. Authentication, and in particular the ability to request encryption of sensitive data when remoted via DCOM, is a useful feature for automation applications.

The security settings on any securable object are determined by applying simple propagation rules, i.e., for an SWbemServices object obtained from a SWbemLocator-.ConnectServer ( ) call, the settings are those determined from the settings on SWbemLocator, if these have been specified in script, or from the current DCOM configuration of the local host. For an SWbemServices or SWbemObject object obtained from a Moniker display string, the settings are as determined by the moniker display string, if the string includes security settings, otherwise, as determined from the current DCOM configuration of the local host.

For a securable object obtained from a method call on another API Object, the security settings are those propagated from the last securable interface used in the propagation chain. By way of example, consider the following operational sequence:

1. Create an SWbemLocator object.
2. Call SWbemLocator.ConnectServer to create an SWbemServices object.
3. Modify the security configuration of the SWbemServices using its Security_ property.
4. Call SWbemServices.Get to obtain an SWbemObject object.

The SWbemObject obtained in step (4) will be created with the same security settings as were applied to the SWbemServices object in step (3).

For a securable object returned from a method call on another API Object, the security settings conferred on the returned securable object are independently modifiable from those on the object on which the method call was made. For example, referring back to the example in the previous bullet, changes to the Security_ property of the SWbemObject obtained in step (4) have no effect on the Security_ property of the SWbemServices object obtained in step (2). The table below describes the API calls that result in propagation of security settings:

| Parent Object | Method Call or Event Callback | New Securable Object |
| --- | --- | --- |
| SWbemLocator | ConnectServer | SWbemServices |
| SWbemservices | Get | SWbemObject |
| SWbemServices | SubclassesOf | SWbemObjectSet |
| SWbemServices | InstancesOf | SWbemObjectSet |
| SWbemServices | ExecQuery | SWbemObjectSet |
| SWbemServices | ExecNotificationQuery | SWbemEventSource |
| SWbemServices | AssociatorsOf | SWbemObjectSet |
| SWbemServices | ReferencesTo | SWbemObjectSet |
| SWbemSink | OnObjectReady | SWbemObject |
| SWbemObject | Instances | SWbemObjectSet |
| SWbemObject | Subclasses | SWbemObjectSet |
| SWbemObject | Associators | SWbemObjectSet |
| SWbemObject | References | SWbemObjectSet |
| SWbemEventSource | NextEvent | SWbemObject |
| SWbemObjectSet | Item | SWbemObject |
| SWbemObjectSet | Next | SWbemObject |

For SWbemSink, the Parent securable object is the object that returned this Sink from an asynchronous call (this will be either an SWbemServices or SWbemObject).

The Privilege Object is not directly creatable, and supports the following properties:

| Name | Type | Purpose | Access |
| --- | --- | --- | --- |
| Identifier | WbemPrivilegeLevelEnum | The Wbem id of this privilege, the "key" of the Privilege from the user's perspective. | read-only |
| Name | BSTR | The NT Privilege Name (e.g. SeShutdownPrivilege). | read-only |
| DisplayName | BSTR | The Privilege DisplayName (e.g. "Shut down the system"), useful for UI. | read-only |
| IsEnabled | BOOL | Whether the Privilege is to be enabled or disabled from the Token. | read-write |

Internally the SWbemPrivilege object will store the LUID (Locally Unique Identifier) of the Privilege, for efficiency of implementation as this is the means by which the Privilege is identified to AdjustTokenPrivileges ( ). Other privileges may include SeUndockPrivilege, SeSyncAgentPrivilege and SeEnableDelegationPrivilege.

The Privilege Collection Object is a collection of SWbemPrivilege objects, and supports the Collection properties Count and _NewEnum. It also supports the standard Collection methods (Add, Item and Remove). The Item implementation allows the use of the Privilege identifier (of type WbemPrivilegeEnum) as the indexing mechanism for the collection. It also supports the DeleteAll method, which removes all Privileges from the Collection. The Add method will accept a WbemPrivilegeEnum value and BOOL (initial state) as parameters.

In addition the AddAsString method will accept a standard NT/Win2K privilege string (e.g. "SeDebugPrivilege") and BOOL (initial state) as an alternative means of specifying the parameters.

The scripting API 74 includes other features, as described hereinafter:

Object Creation using ProgIDs is supported for the following objects:

| Prog ID | Object Returned |
| --- | --- |
| WbemScripting.SWbemLocator | SWbemLocator |
| WbemScripting.SWbemNamedValueSet | SWbemNamedValueSet |
| WbemScripting.SWbemObjectPath | SWbemObjectPath |
| WbemScripting.SWbemLastError | SWbemLastError |
| WbemScripting.SWbemSink | SWbemSink |

In addition the type library 80 for the WBEM Scripting API 74 has the assigned name WbemScripting. The means by which objects are created varies with the programming environment. For example, in VB 5.0, The following syntax can be used to create an object:

Dim Locator as New WbemScripting.SWbemLocator.

In addition, the CreateObject call can be used:

Dim Locator As SWbemLocator 'optional
Set Locator=CreateObject
("WbemScripting.SWbemLocator")

In VBScript 3.0, VBScript supports the CreateObject function:

Set Locator=CreateObject
("WbemScripting.SWbemLocator")

In JScript 3.0, JScript supports the ActiveXObject function:

var locator=new ActiveXObject
("WbemScripting.SWbemLocator")

CPAN Perl for Win32 supports the OLE CreateObject function:

use Win32::OLE;
$locator=Win32::OLE->Createobject
('WbemScripting.SWbemLocator');

In WSH (Windows Scripting Host) 1.0, the WScript object supports the CreateObject function. This can be used in VBScript and JScript scripts run in the WSH environment:

WScript.CreateObject
("WbemScripting.SWbemLocator")

In ASP (Active Server Pages) there is supported the Server.CreateObject function in embedded script: Set Locator=Server.CreateObject
("WbemScripting.SWbemLocator")

In addition, the HTML <OBJECT> tag can be used with a PROGID attribute in the following manner:

<OBJECT RUNAT=Server PROGID=Wbem.LocatorID= MyLocator></OBJECT>

Client side script embedded in HTML supports the <OBJECT> tag with a CLASSID attribute:

```
<OBJECT ID="MyLocator" CLASSID=
"CLSID:76A64158-CB41-11d1-8B02-
00600806D9B6"></OBJECT>
```

The SWbemServices and SWbemObject objects may also be Created from Moniker Display Names. This is supported in VB, VBScript and JScript by the GetObject call.

By way of example of how monikers simplify scripts by putting multiple information in single string, the string Setobj=getobject"(winmgts:nspace/Disk='c:')" gets interpreted by the scripting API 74 as a sequence of instructions such as:

Locator=NewActiveXObject ("Locator")

Set Services=Locator.connector.services(nspace)

Setobj=services.object("Disk=C:")

From the moniker, the scripting API 74 knows that a services object is needed, and thus executes the above instructions to create a locator object. From the nspace parameter the API 74 knows to create a particular service object, and from the "Disk=C:" parameter knows to obtain the appropriate object from the services object.

COLLECTIONS

Considering next collections, certain WBEM object sets correspond to collections. As described above, a collection object is a type of Automation Object that provides built-in support for certain iterative constructs used by automation controllers. The following objects support Collection semantics:

To support manipulation of collections via script, the native language features that surface collections are described in the following paragraphs.

In VB and VBScript, the "for each . . . next" construction is used to manipulate collections, e.g.:

```
for each Process in Getobject("winmgmts:").ExecQuery
   ("select Name from Win32_Process")
   WScript.Echo Process.Name next
```

Alternatively, in Jscript, the Enumerator object is used to manipulate collections, e.g.:

```
e=new Enumerator (myClass.Properties);
for (;!e.atEnd( );e.moveNext ( ))
{
   var y=e.item ( );
   WScript.Echo (y.Name);
}
```

In Perl, the CPAN Win32 Standard Distribution supports the Enum object for creating collections, e.g.:

```
use Win32::OLE;
use Win32::OLE::Enum;
foreach $inst (Win32::OLE::Enum→new
   (Win32::OLE→GetObject('winmgmts:')→ExecQuery
   ($ARGV[0]))→All) {
     foreach $prop (Win32::OLE::Enum→new
        ($inst→{Properties_})→All) {
        print "$prop→{Name} $prop→{Value}\n";
     }
}
```

A collection includes a set of automation objects, and allows for iteration over the set in a standardized way that is understood by many scripting languages. OLE Automation defines a standard interface called "IEnumVARIANT" to provide a consistent, standardized mechanism for scripting languages to iterate over collections.

Every OLE object that is to be a collection exposes a read-only property named "_NewEnum" that returns an enumerator object that supports "IEnumVARIANT". The presence of this property indicates to the scripting languages that the object is a collection and supports iteration. The IEnumVARIANT interface allows for the iteration of the objects contained within the collection, and includes "Next", "Reset", "Skip" and "Clone" methods.

In addition to supporting the "NewEnum" property, collection objects also support a "Count" property that returns the number of items in the collection. Further, the collection object supports the "Item" method. Two further methods, "Add" and "Remove", can be optionally supported by collections. Several WMI scripting objects support collections, including "ISWbemObjectSet", "ISWbemNamedValueSet", "ISWbemQualifierSet", "ISWbemMethodSet", "ISWbemPropertySet" and "ISWbemPriviligeSet".

When a scripting language supports COM automation, it is likely that it also includes some added support for "Automation Collections." The support provided by the scripting

| Collection | Element | Add | Item | Remove | _NewEnum | Count |
|---|---|---|---|---|---|---|
| SWbemWbemNamedValueSet | SWbemNamedValue | ✓ | ✓ | ✓ | ✓ | ✓ |
| SWbemPropertySet | SWbemProperty | ✓ | ✓ | ✓ | ✓ | ✓ |
| SWbemQualifierSet | SWbemQualifier | ✓ | ✓ | ✓ | ✓ | ✓ |
| SWbemObjectSet | SWbemObject | x | ✓ | x | ✓ | ✓ |
| SWbemPrivilegeSet | SWbemPrivilege | ✓ | ✓ | ✓ | ✓ | ✓ | languages allows easy iteration of the elements in a collection without the need to resort to indexing systems.

By way of example, consider the following piece of "Vbscript" script:

```
for I=1 to processes.Count set process=processes.Item(I)
   Wscript.Echo process.name
next I
```

This script shows iteration through a set of process objects, wherein for each process object in the set, the name of the process is printed. Note that because this example does not use collections, a count variable is used to index the items in the collection. This makes the script relatively verbose, and also tends to convey that the set of objects is in some way ordered, which in general may not be true. The script below produces the same result, but uses standard collections to do the iteration:

```
For each process in processes Wscript.Echo process.name
Next process
```

As should be apparent, this example script is less verbose and does not convey the notion of an ordered set. The combination of the support for collections within the WBEM Scripting API (in this example specifically "SWbemObjectSet"), and the explicit support for collections within the scripting languages, produce shorter and more intelligent script.

Other scripting languages also contain varying degrees of support for collection objects. For example here is a "Jscript" script that uses collections to do the same thing as the script above:

```
var e=new Enumerator(processes);
for (;!e.atEnd( );e.moveNext( ))
{
  var process=e.item ( );
  WScript.Echo (process.Name);
}
```

From the above example, "JScript" provides support for collection objects by the use of a subsidiary object that is created to represent the object. In other words, with "Jscript," support for collections is not built into the language itself, but is instead added by the use of a subsidiary object. A clearer script is provided.

The "perl" scripting language also uses a subsidiary object to represent collections, as set forth in the example below:

```
foreach (in $processes)
{
  print "$_ →{name} ";
}
```

The WMI scripting objects that support collections are:
"SWbemObjectSet", "SWbemNamedValueSet", "SWbemQualifierSet", "SWbemMethodSet", "SWbemPropertySet" and "SWbemPriviligeSet".

The SWbemObjectSet collection represents a set of "SWbemObject" objects. The "Item" method used to access individual elements of the collection takes an object path (in the form of an "SWbemObjectPath") as a parameter. Items are not added or removed from this collection, so it does not support the optional "Add" and "Remove" methods. An example of the use of this collection is shown in the "VBScript" script fragment below, which prints out the name of each process in the process collection:

```
For each process in processes Wscript.Echo process.name
Next process
```

The SWbemNamedValueSet collection represents a set of "SWbemNamedValue" objects. The "Item" method used to access individual elements of the collection takes a "name" parameter that is used to identify the specific "SWbemNamedValue" that needs to be accessed. Items in the collection can be added using the "Add" method and removed using the "Remove" method.

This collection also exposes two extra methods. The "Clone" method allows a copy of the "SWbemNamedValueSet" collection to be made. The "DeleteAll" method provides an easy way of deleting all of the objects in the collection without the need to iterate and delete each one. An example of the use of this collection is shown in the "perl" script below:

```
$keys=$process→{Path_}→{Keys};
foreach $key (in $keys)
{
  print "Key: $key→{Name} Value: $key→{Value} \n";
}
```

This script prints out the name and the value of each of the keys in the given "process" object. The "SWbemNamedValue" collection here is the "Keys_" property of the "SWemObjectPath" object.

The SWbemQualifierSet collection represents a set of "SWbemQualifier" objects. The "Item" method used to access the individual elements of the collection takes a "name" parameter that is used to identify the specific "SWbemQualifer" that needs to be accessed. Items in the collection can be added using the "Add" method and removed using the "Remove" method. An example of the use of this collection is shown in the "JSript" script fragment below:

```
Qualifiers.Add ("qsint32", 345);
Qualifiers.Add ("qstring", "freddy the frog");
Qualifiers.Add ("qstring5", "wibble", true, true, false);
Qualifiers("qsint32").Value=7677;
WScript.Echo ("There are", Qualifiers.Count, "Qualifiers");
for (var e=new Enumerator (Qualifiers);!e.atEnd ( );e.moveNext ( ))
{
  WScript.Echo (e.item ( ).Name, "=", e.item ( ));
}
```

This example shows several items ("SWbmQualifier objects) being added to the collection. The "Item" method is also used to illustrate the method of directly accessing a member of the collection. Finally the collection is iterated and some information is printed about each "SWbemQualifier" object.

The SWbemMethodSet Object collection represents a set of "SWbemMethod" objects. The "Item" method uses to access the individual elements of the collection takes a "name" parameter that is used to identify the specific "SWbenMethod" that is to be accessed. Items cannot be added or removed from this collection, so the optional "Add" and "Remove" methods are not supported. An example of the use of this collection is shown in the "VBScript" script fragment below, which shows how information about the names of all of the methods in a class can be printed using an "SwbemMethodSet" object:

```
Set service=GetObject("winmgmts:root/cimv2:win32_service")
'Test the collection properties of IWbemMethodSet
For each Method in service.Methods_WScript.Echo "METHOD:", Method.Name, "from class", Method. Origin
Next
```

The SWbemPropertySet Object collection represents a set of "SWbemProperty" objects. The "Item" method used to access the individual elements of the collection takes a "name" parameter that is used to identify the specific "SWbemProperty" that needs to be accessed. Items in the collection can be added using the "Add" method and removed using the "Remove" method. An example of the use of this collection is shown in the "VBScript" script fragment below:

```
On Error Resume Next
Set service=GetObject("winmgmts:root/cimv2:win32_service")
'Test the collection properties of IWbemMethodSet
For each Method in service.Methods_WScript.Echo "****************************"
WScript.Echo "METHOD:", Method.Name, "from class", Method. Origin
WScript.Echo
WScript.Echo
WScript.Echo "In Parameters:"
if (Method.InParameters < > NULL) Then for each InParameter in Method.InParameters.Properties_
```

```
WScript.Echo " ", InParameter.Name, "<",
   InParameter.CIMType, ">"
Next
End If
WScript.Echo
WScript.Echo "Out Parameters"
if (Method.OutParameters < > NULL) Then for each
   OutParameter                              in
   Method.OutParameters.Properties_WScript.Echo "
   ",      OutParameter.Name,      "<",
   OutParameter.CIMType, ">"
Next
End If
WScript.Echo
WScript.Echo
Next
```

The above example shows how the "SWbemPropertySet" collection in conjunction with the "SWbemMethodSet" object may be used to print out the "in parameters" and the "out parameters" for the methods (represented by "SWbemMethod" objects) in a given class.

The SWbemPrivilegeSet Object collection represents a set of "SWbemPrivilege" objects. The "Item" method used to access the individual elements of the collection takes a "WbemPrivilegeEnum" enumerator parameter that is used to identify the specific privilege to be accessed. Items in the collection can be added using the "Add" method and removed using the "Remove" method.

ASYNCHRONOUS SCRIPTING

As described above, synchronous operations requested of the API suspend until complete, which may include the returning of a result or an error. In accordance with another aspect of the present invention, there is provided an asynchronous behavior, in which operations requested of API return immediately, and then notify the calling script upon completion of the request (e.g., a result or an error).

To this end, COM events, which implemented by using connection points, are used, which may be used in a variety of languages and environments. To implement COM events, when an object is created from a Windows Scripting Host (WSH) using the "Wscript.CreateObject ( )" method, an optional "strPrefix" can be specified. When this prefix string is specified, the WSH connects the object's outgoing interface to the script file after creating the object. When the object fires a COM style event, WSH calls a subroutine named strPrefix and the event name.

By way of example, if the "strprefix" is "MYOBJ_" and the object fires an event named "OnGetObject", WSH calls the "MYOBJ_OnGetObject" subroutine located in the script. This same technique can be used when creating an object using a moniker using "Wscript.GetObject ( ) ".

For example, Visual Basic programmers can declare variables that understand events by using the following syntax (introduced in VB 5.0):

Dim WithEvents obj as ISWbemSink.

This declaration allows the programmer to write event handlers using the "VariableName_EventName" convention. For example given the above definition, the programmer may write the following event handler:

```
Sub obj_OnObjectReady(objObject, objAsyncObject,
   objAsyncContext)
End Sub
```

To implement COM and WMI Events in the scripting API 74, a number of steps are taken in order to expose the asynchronous behavior as COM events. More particularly, COM events are defined by including the "source" attribute on one or more interfaces in a coclass definition. The interfaces that define the events that can be fired by a coclass are called "source", or "outbound" interfaces. The "source" interfaces are interfaces that are implemented by an object in order that events may be received.

In order to receive the results of asynchronous WBEM operations, some source interfaces are provided. In the case of the WBEM API for scripting, four events are defined, i.e., an event that indicates that a WBEM object has become available, an event that indicates that an operation has been completed, an event that gives indication of progress of an asynchronous call and an event that indicates that an object path is available (as the result of a "PutAsync_" call).

The methods are contained within one source interface called "ISWbemSink." As set forth above, this interface is included as a "source" in the single coclass called "SWbemSink." There will be one other interface associated with this coclass called "ISWbemSinkControl." The ISWbemSinkControl interface contains the single method called "Cancel( )."

An SWbemSink will either be created by the scriptwriter and passed in to the async call, or an SWbemSink will be created by the script API. In either case the object is returned by the async call.

The IDL for "SWbemSink" coclass is set forth below:

```
[
   uuid(75718C9A-F029-11d1-A1AC-00C04FB6C223),
      helpstring("WBEM async sink")
]
coclass SWbemSink
{
   interface ISWbemSinkControl; [default, source]
      dispinterface ISWbemSink;
};
```

Each of the methods or events within the "ISWbemSink" interface are also defined. Each of the methods defined in the interface have a logical name to make it clear what the event is signaling. Note that all of the outbound interfaces should be dispatch interfaces to allow maximum compatibility with scripting environments. The "ISWbemSink"" interface is set forth below:

```
const ULONG WBEMS_DISPID_OBJECT_READY=
   1;
const ULONG WBEMS_DISPID_COMPLETED=2;
const ULONG WBEMS_DISPID_PROGRESS=3;
const ULONG WBEMS_DISPID_OBJECT_PUT=4;
[
   uuid(75718CA0-F029-11d1-A1AC-00C04FB6C223),
      helpstring("Interface for WBEM Async result
      events")
]
dispinterface ISWbemSink
{
   properties:
   methods:
   [
      id(WBEMS_DISPID_OBJECT_READY),
         helpstring("Async operation object available")
   ]
   void OnObjectReady( ISWbemObject *pObject,
      ISWbemNamedValueSet *objAsyncContext );
   [
      id(WBEMS_DISPID_COMPLETED), helpstring
         ("Async operation completed")
```

```
]
void OnCompleted ( WbemErrorEnum hResult,
    ISWbemObject *pErrorObject,
    ISWbemNamedValueSet *objAsyncContext );
[
    id(WBEMS_DISPID_PROGRESS), helpstring
        ("Async operation progress report")
]
void OnProgress (
    long upperBound,
    long current,
    BSTR message,
    ISWbemNamedValueSet *objAsyncContext );
[
    id(WBEMS_DISPID_OBJECT_PUT), helpstring
        ("Async operation object put path available")
]
void OnObjectPut(
    ISWbemObjectPath *pObjectPath,
    ISWbemNamedValueSet *objAsyncContext );
};
```

In each case, the ISWbemNamedValueSet that was supplied to the original async call for the purposes of correlation is passed back.

The "OnObjectReady" event will be fired whenever an object is ready to be processed. This may, for example, happen either when a single object is made available as the result of a call to "GetAsync ," or when one or more objects are available from the result of a query for example. When an asynchronous call is made that can result in more than one object being returned, the "OnObjectReady" method may be called repeatedly until all of the result objects have been made available.

The "OnCompleted" handler is fired when an asynchronous call has been completed (this may be due to either success or failure). When "OnCompleted" is fired due to the successful completion of an asynchronous call, there may have been zero or more prior "OnObjectReady" calls. When an asynchronous call results in one or more objects being supplied via one or more calls to the "OnObjectReady" event, the "OnCompleted" event is guaranteed to be fired only after all of the related "OnObjectReady" events have returned.

The "OnCompleted" event is passed an HRESULT, and an error object. The HRESULT is the final result returned from the async call. This may be an error, or a success code. In certain cases of error, an error object may be returned that gives further information about the error.

The "OnProgress" event will be fired whenever progress is to be reported. The "OnProgress" event will be passed the upper bound of the progress, the current progress towards that upper bound, and a string that describes the current state of the progress.

The "OnObjectPut" method will be called as the result of a call to PutAsync_( ). This event is fired prior to the "OnCompleted" event to provide the user with the object path of the object that was put. This can be very useful when the object that was "Put" did not yet have a key for example.

In COM, "Connection Points" are used for registering and revoking callback interfaces with an object. An object provides an implementation of an "IConnectionPoint" interface for each type of interface that can be used for events. In general, Connection Points are not exposed as part of an object's identity, nor can they be discovered by the "QueryInterface".

One IConnectionPoint interface is implemented in the WBEM API, and associated with the new SWbemSink coclass. The actual definition and implementation of the IconnectionPoint interface is described fully in many COM documents, and will not be discussed further here.

Two important methods of the "IconnectionPoint" interface are "Advise ( ) " and "Unadvise ( ) ". These methods are used to register and un-register a sink with a connection point. To illustrate this, the following VB example is provided:

```
Dim WithEvents tmpSink1 As SWbemSink
Dim WithEvents tmpSink2 As SWbemSink
Dim WithEvents tmpSink3 As SWbemSink
Set tmpSink1=New SWbemSink
Set tmpSink2=tmpSink1
Set tmpSink3=tmpSink1
```

In this example, three sinks are added to a single connection using the "Advise( )" call. In this implementation, a large number of sinks can be registered to any one connection point.

Unlike "Connection Points", "Connection Point Containers" are made visible to event sinks, and are the standard mechanism by which an even sink obtains an IconnectionPoint interface. Using an IconnectionPointContainer interface, an event sink can query all of the supported connection points or can obtain a specific connection point (referenced by a GUID). One IConnectionPointContainer interface is implemented in the WBEM API and supported by the SWbemSink coclass.

Two more standard interfaces provide information at runtime about the events that an object supports. The two interfaces are "IprovideClassInfo", and "IprovideClassInfo2". These interfaces allow programmatic access to the type library 80 information via the "GetClassInfo( )" method. Again these interfaces are supported by the SWbemSink interface.

A new asynchronous method is defined for each operation that can be performed asynchronously. These asynchronous versions of the methods are the same as the synchronous version, except that the method name includes the word "Async" after it, to distinguish it from the synchronous version. Also, the asynchronous version will take an extra parameter, which is an SWbemSink. Further, the asynchronous method will take an optional context in the form of an "ISWbemNamedValueSet" object The asynchronous form of the operations work when the user makes a call to an asynchronous operation by creating an SWbemSink object (using whatever mechanism is used in the scripting environment to create COM objects).

The SWbemSink passed to the asynchronous call is used to receive the results of the async call in the form of events defined by the ISWbemSink "source" interface, and fired by the SWbemSink. Each scripting environment uses different techniques to bind the events defined by the SWbemSink returned and a particular subroutine in the scripting language.

The ISWbemSinkControl can also be used to cancel the async operation via the "ISWbemSinkControl::Cancel ( )" method. If multiple operations are in progress using the same sink, then each of the outstanding operations will be cancelled. If the scriptwriter is in need of additional context information, it can be passed in the form of an "ISWbemNamedValueSet" object as an optional parameter to the call.

As can be seen from the foregoing detailed description, there is provided a method and system that enable scripts to be used in a straightforward manner to access system management objects. The scripts are translated in a manner that is transparent to the scriptwriter, providing a flexible and extensible mechanism for accessing management information.

While the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. A method for providing access to system information via a centralized manager of the system information, comprising:
   receiving information corresponding to at least one script instruction from a client process, the information directed to an object and property corresponding to a managed system device;
   locating an object identifier in response to the received information;
   generating a property identifier in response to the information, including adding information to the property identifier indicative of a dynamic property;
   returning the object identifier and the property identifier;
   receiving a request for accessing system information, the request corresponding to the script and including the object identifier and the property identifier;
   recognizing from the information added to the property identifier that the request is directed to accessing a dynamic property of a managed system device,
   translating the request into at least one call for accessing the system information, and via the at least one call, calling an interface of the centralized manager to access the system information;
   in response to each call, the centralized manager determining at least one provider associated with the managed system device and communicating with each provider to access the system information; and
   returning data to the client process indicative of the result of the call.

2. The method of claim 1 wherein receiving the request for accessing system information includes receiving a request corresponding to a property value of an object, and wherein returning data to the client process includes returning the property value.

3. The method of claim 1 wherein receiving the request for accessing system information includes receiving a request corresponding to a property value of an object, and wherein calling an interface of the centralized manager to access the system information includes retrieving the property value.

4. The method of claim 1 wherein receiving the request for accessing system information includes receiving a request corresponding to a property value of an object, and wherein calling an interface of the centralized manager to access the system information includes setting the property value.

5. The method of claim 1 wherein receiving information from the client process includes receiving a string.

6. The method of claim 1 wherein the request for accessing system information corresponds to a request for an object collection.

7. The method of claim 1 wherein the request for accessing system information comprises a moniker corresponding to a sequence of operations represented in a single string.

8. The method of claim 1 wherein returning data to the client process indicative of the result of the call includes providing an event notification to the client process.

9. The method of claim 1 further comprising receiving a request for setting security properties from the client process, the request corresponding to at least one script instruction from the client process.

10. The method of claim 1 wherein the script instruction set comprises a moniker corresponding to a sequence of operations represented in a single string.

11. A computer-readable medium including computer-readable instructions for performing the method of claim 1.

12. A computer-readable medium including computer-readable instructions, comprising:
   receiving at least one call from a scripting engine that is interpreting a script, the at least one call providing a first identifier corresponding to a managed object that represents a managed system device and a second identifier corresponding to a dynamic property of the managed object;
   determining a managed object identifier based on the first identifier;
   determining a property identifier based on the second identifier;
   associating the property identifier with information that indicates that the property of the managed object is dynamic;
   returning the object identifier and the property identifier to the scripting engine;
   receiving an invoke call from the scripting engine, the invoke call including the object identifier and property identifier;
   recognizing that the property is dynamic from the information associated with the property identifier;
   accessing system information from the managed system device by providing translated data corresponding to the object identifier and property identifier to a centralized manager, the centralized manager determining at least one provider of data for the dynamic property based on the translated data and communicating with each provider to access the system information; and
   returning an access result to the scripting engine.

13. The computer-readable medium of claim 12 wherein accessing system information comprises, obtaining a property value of an instance of the managed object from the centralized manager, and wherein returning an access result to the scripting engine includes returning the accessed property value to the scripting engine.

14. The computer-readable medium including computer-readable instructions of claim 13 wherein returning an access result to the scripting engine includes providing an event notification thereto.

15. The computer-readable medium including computer-readable instructions of claim 13 wherein the system information accessed via each provider comprises a collection object.

16. The computer-readable medium including computer-readable instructions of claim 12 wherein accessing system information based on the identifier includes invoking a managed object.

17. The computer-readable medium including computer-readable instructions of claim 12 herein accessing system information based on the identifier includes accessing a managed object property.

18. The computer-readable medium including computer-readable instructions of claim 12 wherein accessing system information based on the identifier includes accessing a managed object method.

19. The computer-readable medium including computer-readable instructions of claim 12 wherein determining the managed object identifier includes accessing a type library to obtain the identifier.

20. The computer-readable medium including computer-readable instructions of claim 12 wherein determining the property identifier includes dynamically generating at least part of the property identifier to associate the property identifier with the information indicating that the property is dynamic.

21. The computer-readable medium including computer-readable instructions of claim 12 wherein determining the property identifier includes accessing a class schema to obtain the property identifier.

22. The computer-readable medium including computer-readable instructions of claim 12 wherein associating the property identifier with information that indicates that the property of the managed object is dynamic further comprises, generating the property identifier by modifying a value obtained from the class schema with the information that indicates that the property is dynamic.

23. The computer-readable medium including computer-readable instructions of claim 12 wherein the at least one call provides the first identifier and the second identifier via first and second calls, respectively.

24. The computer-readable medium including computer-readable instructions of claim 12 wherein the at least one call provides the first identifier and the second identifier via parameters comprising first and second strings, respectively.

25. A system for accessing system information managed by a centralized manager of the system information, the centralized manager arranged for communication via a set of object interfaces, comprising:
   a scripting engine configured to interpret a script;
   an interface component connected to the scripting engine, the scripting engine providing at least one request to the interface component to obtain a property identifier of a property of a managed system object that represents a managed system device corresponding to the system information, the request originating in the script;
   a mechanism in the interface component that returns an object identifier and the property identifier corresponding to the at least one request to the scripting engine; and
   the interface component accessing the system information including:
      1) receiving the object identifier and the property identifier from the scripting engine in an access request from the scripting engine that originated in the script,
      2) recognizing that the access request is directed to a dynamic property of the managed system object, and
      3) accessing the property of the managed system object based on the object identifier and the property identifier by providing a translated request to an object interface of the centralized manager,
   the centralized manager determining a provider therefrom that is associated with the system device corresponding to the managed system object and communicating with the provider to access the system information.

26. The system of claim 25 wherein the interface component comprises an application programming interface.

27. The system of claim 25 wherein the interface component accesses a dynamic property of the managed system object to set that property to a value originating in the script.

28. The system of claim 25 wherein the interface component returns a value for the property of the managed system object.

29. The system of claim 25 wherein the interface component accesses a method of the managed system object.

30. The system of claim 25 wherein the property identifier includes information indicating that the property is a dynamic property such that the interface component recognizes that the access request is directed to a dynamic property.

31. The system of claim 30 wherein the mechanism dynamically generates the property identifier including the information indicating that the property is a dynamic property.

32. The system of claim 25 further comprising a type library, wherein the mechanism selectively accesses the type library to obtain the object identifier.

33. The system of claim 25 wherein the request comprises a moniker, and wherein the interface component translates the moniker into a sequence of instructions represented in a single string.

34. In a computing environment, a method comprising:
   receiving a script instruction set corresponding to at least one script instruction from a client process, the script instruction set including a first request for an object identifier of a managed system object, and a second request for a value of a property of the managed system object; and
   processing the script instruction set to satisfy the first and second requests, including:
      1) determining that the first request for an object identifier is a request for static data,
      2) obtaining the object identifier,
      3) determining that the second request is a request for dynamic property data of an object, and
      4) accessing the dynamic property data via a centralized manager of a managed system device corresponding to the dynamic property data, including translating the second request into a format understood by the centralized manager.

35. The method of claim 34 wherein obtaining the object identifier comprises, accessing a type library to obtain a type identifier, returning the type identifier, receiving an invoke call including the type identifier and data corresponding a managed system device, recognizing that the invoke call is directed to a static object identifier, and communicating the type identifier and the data to an automation library to request the object identifier.

36. The method of claim 34 wherein accessing the dynamic property data comprises, obtaining a property identifier corresponding to the dynamic property data.

37. The method of claim 36 wherein obtaining the property identifier comprises, generating the property identifier including accessing a class schema to obtain an identifier corresponding to the property and modifying the obtained identifier to indicate that the property identifier corresponds to dynamic property data.

38. The method of claim 37 wherein modifying the obtained identifier comprises setting its most significant bit.

39. The method of claim 37 wherein determining that the second request is a request for dynamic property data comprises, analyzing the property identifier to ascertain whether the property identifier has been modified to indicate that the property identifier corresponds to dynamic property data.

40. The method of claim 34 wherein receiving a script instruction set comprises, receiving first and second calls corresponding to the first and second requests.

41. The method of claim 34 wherein the second request for a value of a property comprises an invoke request including the object identifier and the property identifier.

42. The method of claim 34 wherein accessing the dynamic property data via a centralized manager comprises, calling an interface of the centralized manager.

43. The method of claim 34 wherein receiving the script instruction set comprises receiving a request to set the property of the object, and wherein accessing the dynamic property data via a centralized manager comprises communicating with the centralized manager to set the property value.

44. The method of claim 34 wherein the script instruction set comprises a request for accessing an object collection.

45. The method of claim 34 wherein receiving the script instruction set comprises receiving a request to set a security property of the object, and wherein accessing the dynamic property data via the centralized manager comprises communicating with the centralized manager to set the security property to a value.

46. The method of claim 34 wherein receiving the script instruction set comprises receiving a request to obtain the property value of the object, wherein accessing the dynamic property data via the centralized manager comprises communicating with the centralized manager to obtain the property value, and further comprising, returning the obtained property value in response to the request.

* * * * *